Aug. 24, 1943.  J. BOLSEY  2,327,857
FILM THREADING SYSTEM
Filed Oct. 26, 1940
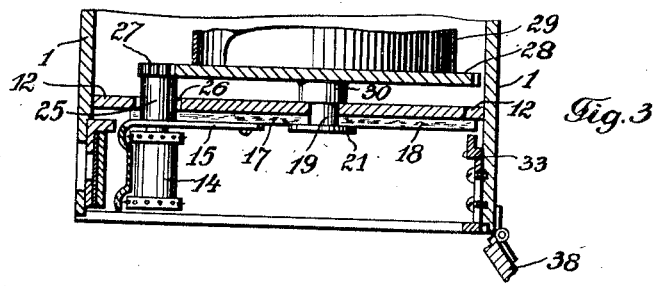
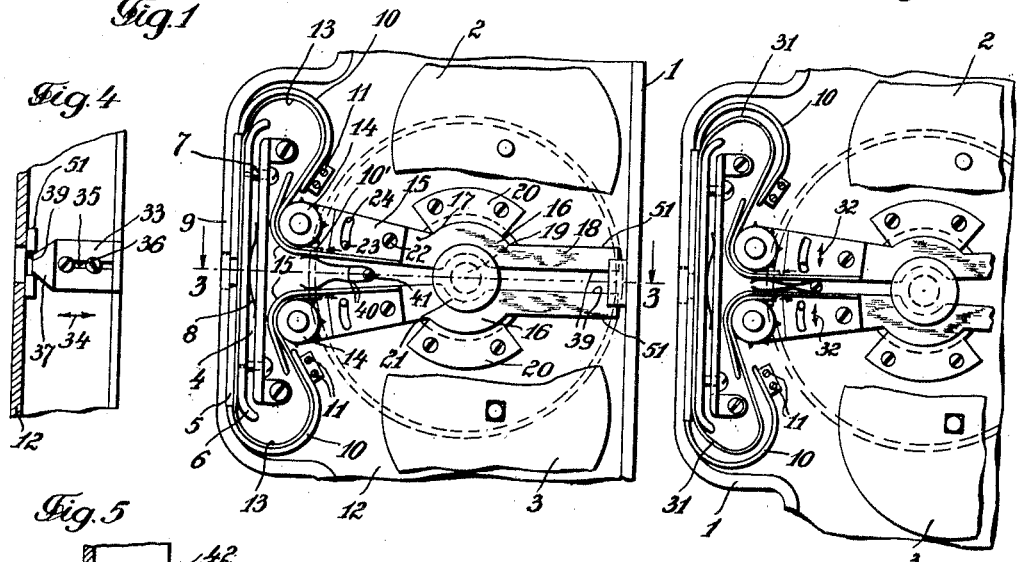
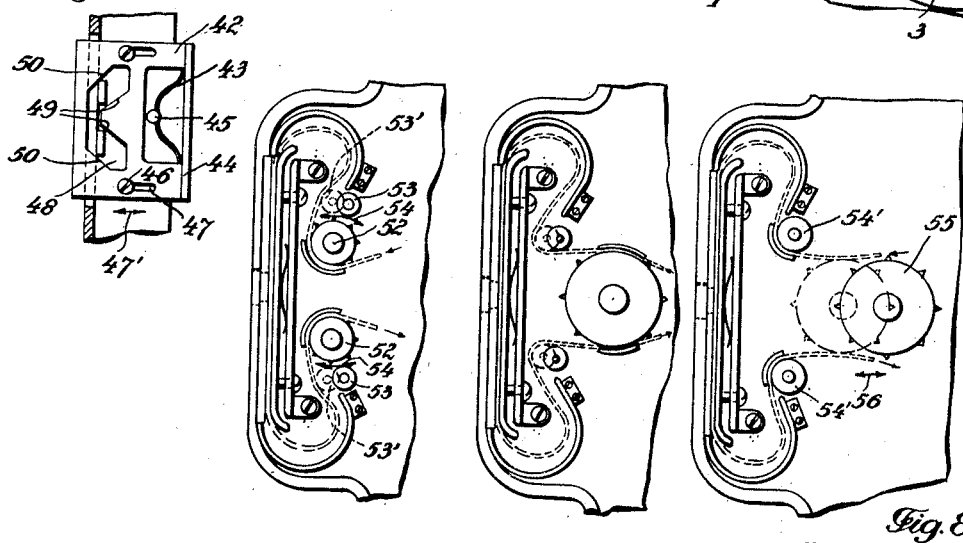
INVENTOR
BY *Jacques Bolsey*
AGENT.

Patented Aug. 24, 1943

2,327,857

UNITED STATES PATENT OFFICE 2,327,857

FILM THREADING SYSTEM

Jacques Bolsey, New York, N. Y.

Application October 26, 1940, Serial No. 362,915

15 Claims. (Cl. 88—17)

My invention relates to motion picture apparatus, and more particularly to means for automatic guiding and threading a film through such an apparatus.

It is the main object of my invention to provide for a motion picture apparatus a completely automatic threading system that shall require a minimum degree of mental and physical exertion for its manipulation on the part of the operator of said apparatus.

A further object of my invention consists in an automatic film-threading system for cinematographic apparatus provided with stationary guiding and loop-forming members on both ends of the film gate of said apparatus.

Still a further object of my invention consists in a motion picture camera provided with my new film-threading system.

Another object of my invention consists in providing means which are adapted to operate the loop-forming members of my new film-threading system automatically by opening and closing the cover of the camera casing.

In order to attain the aforesaid objects, I propose to provide in a motion picture apparatus a combination of a film gate, stationary loop-forming members cooperating with this film gate, and means being adapted to shorten, after threading, the film loops formed by these stationary loop-forming members. It is self-evident that—especially for motion picture apparatus provided with means for intermittently advancing the film past the film gate—loop-forming members are necessary: in this case the film loops have to be shortened after threading to an extent as to allow free breathing of the film loops during the intermittent movement of the film past the film gate.

In accordance with a preferred embodiment of my invention I propose to provide only outer loop-forming members limiting the maximal size of the film loop formed by these members; in this embodiment of my invention I do not provide inner loop-forming members, and thus I do not form by such inner and outer members a channel through which the film passes.

I have further found that by giving these loop-forming members an arcuate form, and by guiding the film by other guiding means against the inner surfaces of these outer loop-forming members the film forms, by its own resiliency, loops substantially along these inner surfaces. After having formed these loops I have to shorten them in order to get final operative loops being at a certain distance from the stationary loop-forming members; thus, these shortened loops are not in contact with the stationary loop-forming members, and can freely breath during the intermittent movement of the film past the film gate.

I have further found it advantageous to arrange the means for shortening the loops substantially at one end of each of the loop-forming members and to have the other ends of these members cooperating with the film gate in such a manner as to form, together with this gate, a unit film way.

In order to attain substantially automatic guiding and threading of the film I provide, besides the loop-shortening means, separate means adapted to operate, after threading, these loop-shortening means. In motion picture cameras these means for operating the loop-shortening system are put into action automatically by closing of the camera cover, i. e., after the film-threading has been finished and the camera is ready for taking pictures.

The novel features which I consider characteristic of my invention are set forth in particular in the appended claims. The invention itself, however, both as to its construction and its method of operation, together with additional objects and advantages thereof, will best be understood from the following description of specific embodiments, when read in connection with the accompanying drawing, in which:

Fig. 1 is a view, in front elevation, showing the principal elements of the automatic threading system of a camera, immediately after threading, Fig. 2 is a view, in front elevation, showing the same automatic threading system, after action of the loop-shortening means, Fig. 3 is a cross section of the camera, shown in Fig. 1, along line 3—3, Figs. 4 and 5 are plane views of different embodiments of the means for operating the loop-shortening system of the camera, and Figs. 6, 7 and 8 are schematic plane views of various embodiments of my new loop-shortening system.

Fig. 1 shows a front elevation of my new camera. As usual, within camera casing 1 there are a supply, i. e., feed or unwinding reel 2, a take-up reel 3, and a film gate 4. This film gate comprises an aperture plate 5, a pressure plate 6, pins 7, guiding said aperture plate parallel to the pressure plate, and a spring 8, by action of which the aperture plate is pressed against the picture gate 9.

The film 10' is unwound from the supply reel 2 and is wound, after passage between picture gate 9 and aperture plate 5, on the take-up reel 3.

Means, not shown in the drawing, are provided for intermittently moving the film past the film gate, i. e., past the aperture plate 5. The actuation of the take-up reel and of the supply reel does not form part of my invention. In the same manner, the construction of the casing itself, the optical construction of the camera, the means for actuating the shutter do not form part of the present invention and are not illustrated in the drawing.

In all embodiments of my invention, shown in the drawing, I provide two stationary loop-forming members 10 of arcuate shape; these members are fixed by screws 11 to the partition wall 12, arranged within the camera casing. As stated above, these loop-forming members are to be shaped and mounted in such a manner that the film forms by its own resiliency loops 13 being in contact with the inner surface of these loop-forming members when the film is guided against the inner surface of these members, as shown in the drawing. This resiliency also causes that during threading the film moves along the inner surface of the first loop-forming member 10, enters the space between aperture plate 5 and picture gate 9, and, after having passed this space, comes in contact with the second loop-forming member 10 and is guided along the inner surface of this member back to the take-up reel 3. Thus, these stationary loop-forming members are limiting the size of the loops 13 formed by these members themselves.

In my new camera shown in Figs. 1 to 5, transport sprockets 14 and guiding means, e. g., guiding plates 15 are arranged for guiding the film against and into contact with the loop-forming members 10, and for transporting it past the film gate.

In accordance with my invention, these transport sprockets 14 and the cooperating guiding plates 15 are arranged at the ends of lever-like members 16.

These members 16 are shaped and arranged as shown in Fig. 1; each of them consists of two lever arms 17 and 18; both members are arranged turnable around the stub shaft 19. For guiding these members 16 around this shaft 19 arcuate bearing plates 20 are arranged pressing against the cylindrical surface of these members. Cover plate 21 is secured to the end of stub shaft 19 in order to hold the members 16 in their position.

As furthermore shown in Fig. 1, the guiding plates 15 are swingably secured by screws 22, pins 23, and cooperating slots 24 to the lever arms 17. By turning the guiding plates around the screws 22 as pivots, these guiding plates can be swung against and from the sprockets 14.

As shown in Fig. 3, the sprockets 14 are carried by stub shafts 25, passing through arcuate slits 26 provided in the partition plate 12. Stub shafts 25 carry at their other ends pinions 27, which are in mesh with the tooth crown 28; tooth crown 28 is secured to the casing 29 enclosing the camera spring and is carried by shaft 30. I want to note that shaft 30, carrying tooth crown 28, and shaft 19 carrying the lever-like members 16 are arranged coaxially, and thus the sprockets 24 and the pinions 27 move along circles being concentric with the tooth crown 28. Thus, when the lever arms 17 are swung around their shaft 19 the pinions 27 remain constantly in mesh with the tooth crown 28.

The method of operating my loop-shortening system is the following:

When film loops are to be formed, the lever members 16 are swung in such a way that the lever arms 18 are near to each other, while the lever arms 17 are distant from each other, as shown in Fig. 1. In this position the lever members 16 and sprockets 14 being inoperative, the film is formed into loops 13 along the inner surface of the loop-forming members 10. The lever members 16 are then moved into operative position. In this movement, the sprockets 14 will be positively turned through the engagement of the pinions 27 with crown 28, and will thus take up a part of the film loops 13. This "loop-shortening" turning of the sprockets 14 is supported and supplemented by their additional swinging around their common shaft 19 in direction to each other, i. e., away from the loop-forming members 10. This combined movement of the film sprockets brings the film into the position shown in Fig. 2. In this position the film loops 31 are separated from the loop-forming members 10, and far enough from them as to allow free breathing of the film loops during the intermittent movement of the film past the film gate.

I want to stress that the combination of these two movements, i. e., the turning and swinging of the sprockets 14 is not absolutely necessary: if the sprockets are turning in the above indicated direction without being swung, this turning alone will have a loop-shortening effect; in the same way, their swinging in the direction as indicated by arrow 32, without any turning, would have a loop-shortening effect, too. However, the combined effect of turning and swinging enables to attain a relatively great shortening of the loops by a relatively small displacement, e. g., swinging of the sprockets.

In order to make operation of this loop-shortening system independent from the operator of the camera, I arrange, in a preferred embodiment of my invention, means being adapted to operate this system automatically, e. g. by opening and closing the camera cover. For this purpose an operating member 33, shown in Figs. 1, 3, and 4, is provided for. This member 33 is secured to the camera casing 1 slidably, in the direction of arrow 34. The slidable attachment is achieved by a longitudinal slot 35 in member 33 engaging with pins 36 fixed to the camera casing 1. One end of member 33 is provided with a projection 37 cooperating with the camera cover 38 in such a way that, when the camera cover is closed, member 33 is pressed against, i. e., between lever arms 18 of the lever members 16. The end of the member 33 engaging the lever arms 18 is provided with inclined faces. In pressing these inclined faces against the inner edges 39 of the lever arms 18, these lever arms are pressed from each other. It is self-evident that this movement of the lever arms 18 from each other results in a movement of the lever arms 17 to each other.

For pressing the lever arms 17 and the sprockets 14 carried by them from each other, a compression spring 40 is provided; this spring is secured by pin 41 to the partition wall 12, and is pressing against the inner faces of arms 17.

The operation of this automatic operating system is the following: When the camera casing is open, i. e., during threading, the operating member 33 is out of contact with the lever arms 16 and the compression spring 40 pushes lever arms 17 from each other, i. e., the lever arms are in the position shown in Fig. 1. In this position loops are formed by members 10.

After threading, the camera cover 38 is closed, the operating member 33 pushed between lever arms 18, these lever arms pressed from each other, and the lever arms 17 are pressed thereby against the action of spring 40 to each other, i. e., into the position shown in Fig. 2. In this position the loops are shortened and the camera ready for operation.

Fig. 5 shows a modified embodiment of an operating member adapted for a system which is not equipped with compression spring 40. In this case the operating member 42 has the shape shown in Fig. 5. Spring 43 cooperating with pin 45, being secured to the camera casing, presses this member 42 constantly upwards against the camera cover 38; thus, when closed, the cover 38 engages edge 44 of member 42. Pins 46 and slots 47 are provided in order to enable sliding of operating member 42 in the direction indicated by arrow 47' along the camera wall. For engaging the ends of the lever arms 18 a cut-out 48, having the shape as shown in Fig. 5, is provided for in member 42. This cut-out is provided with two inclined inner faces 49 and two inclined outer faces 50; the inner faces engage the inner edges 39, and the outer faces 50 engage the outer edges 51 of the lever arms 18. It is self-evident, and needs no further detailed explanation and description, that by movement of the operating member in the direction indicated by arrow 47 the lever arms 18 are guided to and from each other, moving thereby lever arms 17 and sprockets 14, carried by them in the needed manner. As the movement of this operating member 42 is achieved by closing and opening of the camera cover only, operation of the loop-shortening system by this operating member is automatic, and does not need separate actions by the operator of the camera.

Fig. 6 shows a loop-forming and shortening system in which two stationary transport sprockets 52 are provided for. These sprockets are driven in the usual way. The stationary arcuate loop-forming members 10 are arranged substantially in the same manner as described above in connection with the embodiment of my invention shown in Figs. 1 to 4. In order to vary the size of the loop formed by these loop-shortening members 10, two guiding means, e. g., guiding rollers 53 are provided for; these guiding rollers are adjustably movable in such a manner as to vary by their movement the length of the film between the sprockets 52 and the loop-forming members 10, in order to shorten by their movement the length of the loop formed by these members. Thus, for instance, these rollers may be movable in the direction indicated by arrow 54; in this case the rollers are swung after threading of the film into position 53', and thereby the loops are shortened, as indicated in dotted lines.

The embodiment of my invention shown in Fig. 7 is substantially identical with the embodiment shown in Fig. 6: the sole difference being that for transporting the film, one stationary sprocket 53 is arranged only, instead of two.

In Fig. 8 a further modified embodiment of my invention is shown. In this embodiment I provide for two stationary guiding rollers 54'. I further arrange a transport sprocket 55, being adjustably movable in direction of arrow 56, i. e., substantially normal to the plane of the film gate; thus, by moving sprocket 55 in the indicated direction into the position indicated by dotted lines, I am able to vary the length of the film portions between said sprocket 55 and the free ends of the loop-forming members 10, thereby varying, e. g., shortening, after threading, the film loops in the indicated way to the desired extent.

I want to stress that in the embodiments shown in Figs. 6 to 8 I may use instead of guiding rollers other guiding means, e. g., guiding plates being similar to the guiding plates 15 shown in Fig. 1.

It will also be understood that each of the elements above described, or two or more together, may also find a useful application in other types of cinematographic apparatus differing from the types described above.

While I have illustrated and described the invention as embodied in cinematographic apparatus, I do not intend to be limited to the details shown, since various modifications and structural changes may be made without departing in any way from the spirit of my invention.

What I claim as new and desire to secure by Letters Patent is:

1. In a motion picture apparatus, a film gate, stationary loop-forming members cooperating with said film gate for substantially automatic threading of a film, two transport sprockets for transporting said film through said apparatus, two film guides, each arranged between one of said sprockets and said stationary loop-forming members guiding the film transported by said sprockets against the inner faces of said stationary loop-forming members, compelling thereby said film to move along said inner faces of said stationary loop-forming members and past said film gate, and two members each carrying one of said sprockets and one of said film guides slidably between two positions one of which is nearer to the corresponding loop-forming member and the other farther therefrom, enabling thus moving of said sprockets and said film guides after threading from said nearer to said farther position, thereby shortening the film loop portions being adjacent to said loop-forming members and moving these film loop portions out of contact with these loop-forming members.

2. In a motion picture apparatus, an apparatus body, a film gate comprising an aperture plate and a pressure plate, means for intermittently advancing a film past said film gate, two stationary arcuate outer loop-forming members, one end of each of said loop-forming members cooperating with said aperture plate, said stationary loop-forming members thus serving for continuous outer guiding and automatic threading of said film through said apparatus, two transport sprockets transporting said film, film guides arranged between said sprockets and said loop-forming members guiding the film transported by said sprockets against the inner faces of said stationary arcuate outer loop-forming members, compelling thereby said film to move along said inner faces of said loop-forming members and past said film gate, and supporting members movably secured to said apparatus body and carrying said sprockets and film guides slidable between two positions one of which is nearer to the corresponding loop-forming member and the other farther therefrom, enabling thus moving of said sprockets and said film guides after threading from said nearer to said farther position, thereby shortening the film loop portions being adjacent to said loop-forming members and moving these film loop portions out of contact with these loop-forming members.

3. In a motion picture apparatus according to claim 2, in combination lever-like members, each of them carrying near its outer end one of said movable sprockets and a gear driving said sprockets, said lever-like members being adapted to swing about a common shaft, and a main driving gear mounted coaxially with said swingable lever-like members and being in mesh with both gears carried by these members.

4. In a motion picture apparatus according to claim 2, means being adapted to hold said sprockets during threading of the film at a certain distance from each other, and means being adapted to diminish the distance between said sprockets after threading, thus shortening the film loops formed by said stationary loop-forming members, one of said means being a spring member acting automatically when released, and the other being mechanical means being adapted to be operated by the user of said apparatus.

5. In a motion picture apparatus according to claim 2, two lever-like members, each of them consisting of two lever arms turning about a common shaft, and each of them carrying near the end of one of these lever arms one of said sprockets in such a manner as to be adapted to change, by turning of said lever-like members about said shaft, the length of the film loops formed by said stationary loop-forming members.

6. In a motion picture apparatus a film gate, comprising an aperture plate and a pressure plate, means for intermittently advancing the film past said film gate, two stationary arcuate outer loop-forming members, one end of each of said loop-forming members cooperating with said aperture plate, thus serving for continuous outer guiding and automatic threading of the film through said apparatus, two movable transport sprockets, film guides cooperating with said sprockets, said sprockets and said film guides being adapted to move the film along the inner surface of said loop-forming members and past said film gate, two lever-like members, each of them consisting of two lever-arms turning about a common shaft and each of them carrying near its end one of said sprockets in such a manner as to be adapted to shorten the peripheric length of the film loops by diminishing the distance between the lever arms carrying the sprockets, and means being adapted to hold said lever arms during threading apart from each other.

7. In a motion picture camera a camera casing equipped with a camera cover, a film-feeding mechanism within said camera casing, said film-feeding mechanism comprising a film gate with an aperture plate, means for intermittently advancing the film past said film gate, two stationary arcuate outer loop-forming members, one end of each of said loop-forming members cooperating with said aperture plate, thus serving for continuous outer guiding and automatic threading of the film through said apparatus, two movable sprockets, film guides cooperating with said sprockets, said sprockets and said film guides being adapted to move the film along the inner surface of said loop-forming members and past said film gate, two lever-like members, each of them consisting of two lever-arms turning about a common shaft and each of them carrying near its one end one of said sprockets in such a manner as to be adapted to shorten the length of the film loops formed during threading by diminishing the distance between the lever arms carrying the sprockets, a compression spring member arranged between said lever arms, means operated by said camera cover being adapted to allow action of said spring member when said camera cover is opened, and to avoid action of said spring when said cover is closed, thus enabling shortening of the film loops formed by said loop-forming members by closing the cover of the camera.

8. In a motion picture camera, a camera casing provided with a camera cover, a film gate, a stationary loop-forming member cooperating with said film gate for substantially automatic threading of a film through said camera and moving the same past said film gate, film transporting means cooperating with said stationary loop-forming member, said film transporting means being secured to said apparatus body slidable between two positions one of which is nearer to said stationary loop-forming member and the other farther therefrom, enabling thus moving of said film transporting means after threading from said nearer to said farther position, thereby shortening the film-loop portion being adjacent to said stationary loop-forming member and moving this loop-portion out of contact with this member, and means operated by said camera cover automatically sliding said sprocket from said nearer to said farther position when said camera cover is closed and automatically sliding said sprocket from said farther to said nearer position when said camera cover is opened.

9. In a motion picture camera a camera casing provided with a camera cover, a film gate comprising an aperture plate and a pressure plate, means for intermittently advancing the film past said film gate, two stationary arcuate outer loop-forming members, one end of each of said loop-forming members cooperating with said aperture plate, serving thereby for continuous outer guiding and automatic threading of the film through said apparatus, two transport sprockets, film guides cooperating with said sprockets, said sprockets and said film guides being adapted to move the film along the inner surface of said loop-forming members and past said film gate and being arranged at the other ends of said loop-forming members movable substantially parallel to the plane of the film gate, means adapted to automatically slide said transporting sprockets in direction to each other when said camera cover is closed, and means adapted to automatically slide said transport sprockets away from each other when the camera cover is opened.

10. In a motion picture apparatus, a film exposing member, a film transporting member, stationary film threading means extending between said members and forming an outer substantially arcuate film guide by which the film is guided automatically from one of said members to the other when it is moved past one of said members against said film threading means, and a movable support carrying said film transporting member slidably between two positions one of which is nearer to said film threading means and the other farther therefrom, moving thereby the film loop formed by said film threading means out of contact with the same.

11. In a motion picture apparatus, a film exposing member, a film transporting sprocket member, stationary film threading means extending between said members and having an inner substantially arcuate film guiding face by which the film is guided automatically from one of said members to the other when it is moved past one of said members against said inner arcuate film guiding face, and a movable support carrying said film transporting sprocket member slidably between two positions one of which is nearer to said film threading means and the other farther therefrom, thereby moving the film loop formed by said film threading means out of contact with the same.

12. In a motion picture apparatus, a film exposing member, a film guiding idler roller member, stationary film threading means extending between said members and having an innner substantially arcuate film guiding face by which the film is guided automatically from one of said members to the other when it is moved past one of said members against said inner arcuate film guiding face, and a movable support carrying said film guiding idler roller member slidably between two positions one of which is nearer to said film threading means and the other farther therefrom, thereby moving the film loop formed by said film threading means out of contact with the same.

13. In a motion picture apparatus, a film gate, two film transporting members, two stationary film threading means, one of said film threading means extending between one of said film transporting members and said film gate and forming an outer substantially arcuate film guide by which the film is guided automatically from said film transporting member to said film gate when it is moved by said film transporting member against said film threading means, the other of said film threading means extending between said film gate and the other of said film transporting members and forming an outer substantially arcuate film guide by which the film is guided automatically from said film gate to said other film transporting member when it is moved past said film gate against said film threading means, and at least one movable support carrying said film transporting members slidably between two positions in one of which each of said film transporting members is nearer to the corresponding stationary film threading means and in the other of which each of said film transporting means is farther from said corresponding film threading means moving thereby the film loops formed by said stationary film threading means out of contact with the same.

14. In a motion picture apparatus, a film gate, two stationary film guiding means arranged at a certain distance from said film gate so as to allow formation of a film loop between said guiding means and said film gate, two stationary film threading means, one of said film threading means extending between one of said film guiding means and said film gate and forming an outer substantially arcuate film guide by which the film is guided automatically from said stationary film guiding means to said film gate when it is moved past said film guiding means against said film threading means, the other of said film threading means extending between said film gate and the other of said film guiding means and forming an outer substantially arcuate film guide by which the film is guided automatically from said film gate to said other film guiding means when it is moved past said film gate against said other film threading means, and a transport sprocket co-operating with said guiding means and engaging the film before it has passed one of said guiding means and after it has passed the other of said guiding means, said sprocket being adjustably movable in such a manner as to vary the length of the film portions between said sprocket and said film guiding means.

15. In a motion picture apparatus, a film gate, two stationary film guiding idler rollers arranged at a certain distance from said film gate so as to allow formation of one film loop between said film gate and each of said idler rollers, two stationary film threading means, one of said film threading means extending between one of said idler rollers and said film gate and having an inner substantially arcuate film guiding face by which the film is guided automatically from said idler roller to said film gate when it is moved past said idler roller against said inner arcuate film guiding face, the other of said film threading means extending between said film gate and the other idler roller and having also an inner substantially arcuate film guiding face by which the film is guided automatically from said film gate to said other idler roller when it is moved past said film gate against said inner arcuate film guiding face of said other film threading means, and a transport sprocket co-operating with said idler rollers and engaging the film before it has passed one of said idler rollers and after it has passed the other of said idler rollers, said transport sprocket being adjustably movable substantially normal to the plane of said film gate, thereby varying the length of the film portions between said sprocket and said idler rollers and moving the film loops formed by said stationary film threading means out of contact with the same.

JACQUES BOLSEY.